US010501060B2

(12) United States Patent
Takemura et al.

(10) Patent No.: US 10,501,060 B2
(45) Date of Patent: Dec. 10, 2019

(54) BRAKING CONTROL DEVICE FOR VEHICLE (71) Applicant: Mazda Motor Corporation, Aki-gun, Hiroshima (JP)

(72) Inventors: Kazuhiro Takemura, Hiroshima (JP); Naoki Yamada, Hiroshima (JP); Yuta Tango, Hiroshima (JP); Shinichi Kaihara, Hiroshima (JP); Noboru Kyuto, Hiroshima (JP); Hirotaka Mochizuki, Hiroshima (JP); Takanobu Kamura, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/045,152

(22) Filed: Jul. 25, 2018

(65) Prior Publication Data
US 2019/0061717 A1 Feb. 28, 2019

(30) Foreign Application Priority Data

Aug. 23, 2017 (JP) .................................. 2017-159952

(51) Int. Cl.
*B60T 8/1755* (2006.01)
*B60T 13/66* (2006.01)
(Continued)

(52) U.S. Cl.
CPC .......... *B60T 8/17555* (2013.01); *B60T 7/042* (2013.01); *B60T 8/171* (2013.01); *B60T 8/172* (2013.01);
(Continued)

(58) Field of Classification Search
CPC .... B60T 8/17555; B60T 8/409; B60T 13/686; B60T 8/171; B60T 8/172; B60T 13/662;
(Continued)

(56) References Cited

U.S. PATENT DOCUMENTS 6,542,793 B2 * 4/2003 Kojima ................... B60T 7/042
180/170
7,188,913 B2 * 3/2007 Yokoyama .......... B60T 8/17616
303/113.4
(Continued)

FOREIGN PATENT DOCUMENTS

JP 2011143915 A 7/2011

*Primary Examiner* — Frederick M Brushaber
(74) *Attorney, Agent, or Firm* — Alleman Hall Creasman & Tuttle LLP (57) ABSTRACT

A braking control device for a vehicle is provided, which includes an operating amount detecting part configured to detect an operating amount of a brake pedal, a reaction-force giving part configured to generate a reaction force of the brake pedal, a braking-force generating part configured to generate a braking force for wheels, and an ECU electrically connected with them and configured to control the reaction-force giving part and the braking-force generating part, and set a braking characteristic in which the reaction force according to a stepping force of the brake pedal and a deceleration of the vehicle have a logarithmic relationship, and when the reaction force is above a given reaction force. The ECU controls the braking-force generating part based on the braking characteristic while making the deceleration for the reaction force higher than the logarithmic relationship.

6 Claims, 5 Drawing Sheets (51) Int. Cl.
  *B60T 8/172* (2006.01)
  *B60T 8/171* (2006.01)
  *B60T 7/04* (2006.01)
  *B60T 8/32* (2006.01)
  *B60T 7/06* (2006.01)
  *B60T 8/40* (2006.01)
  *B60T 13/68* (2006.01)

(52) U.S. Cl.
  CPC ............... *B60T 13/662* (2013.01); *B60T 7/06* (2013.01); *B60T 8/326* (2013.01); *B60T 2220/04* (2013.01)

(58) Field of Classification Search
  CPC .... B60T 7/042; B60T 2270/82; B60T 8/4081; B60T 2220/02; B60T 2220/04; B60T 7/06; B60T 8/326
  See application file for complete search history.

(56) References Cited

U.S. PATENT DOCUMENTS

| | | | | |
|---|---|---|---|---|
| 7,942,483 B2* | 5/2011 | Hatano | ................ | B60T 8/4081 303/116.1 |
| 8,210,621 B2* | 7/2012 | Ajiro | ...................... | B60T 8/172 303/113.4 |
| 8,315,773 B2* | 11/2012 | Ishikawa | ................. | B60T 7/122 303/166 |
| 8,515,643 B2* | 8/2013 | Rubenbauer | ............ | B60T 8/172 700/282 |
| 8,573,710 B2* | 11/2013 | Yamamoto | ............ | B60T 8/4081 303/113.2 |
| 8,888,197 B2* | 11/2014 | Miyazaki | .............. | B60T 8/4081 303/9.61 |
| 9,365,198 B2* | 6/2016 | Masuda | ................ | B60T 13/143 |
| 9,428,168 B2* | 8/2016 | Maruo | ................... | B60T 11/224 |
| 9,446,749 B2* | 9/2016 | Okano | ...................... | B60T 1/10 |
| 9,630,609 B2* | 4/2017 | Kim | ...................... | B60T 17/221 |
| 9,631,918 B2* | 4/2017 | Weiberle | ................. | B60T 7/042 |
| 9,663,086 B2* | 5/2017 | Ozeki | ..................... | B60T 7/042 |
| 9,683,584 B2* | 6/2017 | Masuda | ................ | B60T 8/4077 |
| 9,701,298 B2* | 7/2017 | Darscht | ................ | B60T 8/4081 |
| 9,783,170 B2* | 10/2017 | Ninoyu | .................... | B60T 8/17 |
| 9,932,024 B2* | 4/2018 | Kinoshita | .............. | B60T 7/042 |
| 10,000,191 B2* | 6/2018 | Wuerth | ................. | B60T 13/145 |
| 2001/0038243 A1* | 11/2001 | Isono | ..................... | B60K 6/365 303/116.1 |
| 2007/0159001 A1* | 7/2007 | Miyazaki | .............. | B60T 8/3275 303/113.4 |
| 2013/0221736 A1* | 8/2013 | Kuki | ..................... | B60T 13/686 303/20 |
| 2019/0061717 A1* | 2/2019 | Takemura | ............ | B60T 13/686 |

* cited by examiner

BRAKING CONTROL DEVICE FOR VEHICLE

TECHNICAL FIELD

The present disclosure relates to a braking control device for a vehicle, and particularly to the braking control device capable of controlling behavior of the vehicle based on a braking characteristic which conforms to a human perception characteristic.

BACKGROUND OF THE DISCLOSURE

Conventionally, in a vehicle control, when a vehicle operator operates a brake pedal, a target operating amount is set based on an operating characteristic (control map) where a correlation between an operating amount of the brake pedal and a deceleration of the vehicle is defined, and the behavior of the vehicle is controlled based on the target operating amount. Meanwhile, in order to improve an operating feel of the operator, numerous controllers which perform a vehicle control conforming to the operator's sensitivity based on psychophysics are proposed. As expressions of a relationship between the physical quantity and the sensation (perceived intensity) in the form of a function, the Weber-Fechner law and Stevens's power law are known. Fechner's law is a law in which the sensation is proportional to the logarithm of stimulus intensity, and Stevens's law is a law in which the sensation is proportional to a power of the stimulus intensity.

JP2011-143915A does not disclose a braking control device, but does disclose a vehicle control device including an acceleration generator which generates acceleration on a vehicle, and a controller which controls the acceleration generator based on an accelerator opening corresponding to operation of an accelerator pedal by a vehicle operator, and a vehicle speed. A relationship between the accelerator opening and a demanded acceleration is changed based on the minimum generating acceleration which can be generated by the acceleration generator, while maintaining the characteristic of the exponential function of the Weber-Fechner law.

In recent years, vehicles with a by-wire system are known, provided with an operating mechanism which is operated by a vehicle operator, a reaction-force generating mechanism which gives a reaction force of the operation to the operating mechanism, and a driving mechanism which drives the vehicle so that the vehicle is operated by a given response amount according to the operating amount to the operating mechanism. In the vehicles which adopt such a by-wire system, the mechanical coupling mechanism of the operating mechanism and the driving mechanism is replaced with an electrical-signal coupling, and thus, the operating mechanism and the driving mechanism are configured to be independent elements so that the actual operating amount of the operating mechanism by the operator, the reaction force amount to the operator, and the response amount of the vehicle are mechanically separated.

Generally, during operation of a vehicle, the operating states, such as an environmental recognition by the operator, a circumstance judgment by the operator, a device operation by the operator, and a response operation by the vehicle, change in this order. Here, the recognition, the judgment, and the operation are elements which are mainly judged in the operator's sensory area, and the response amount accompanying the behavior of the vehicle is an element which is mainly judged in a physical area. For this reason, a deviation arises between the perceived intensity which the operator senses through vision or somatic sensation and the physical response amount by which the vehicle is actually operated, and a deviation also arises between the perceived intensity which the operator senses through somatic sensation and the physical operating amount by which the operator actually operates the operating mechanism (or the reaction force amount accompanying the operation). That is, in the situation where the operator is operating the operating mechanism of the vehicle, it is necessary to suitably give the perceived intensity in consideration of the operator's sensory characteristic to the operator, with the perception characteristics of the human limbs in mind.

Like the vehicle control device disclosed in JP2011-143915A, when the human perception characteristics are taken into consideration, the linearity of the operator's perceived reaction force and the vehicle behavior can be secured, and a suitable operating feel can be expected by setting a braking characteristic in which the reaction force of the brake pedal and the deceleration of the vehicle have a logarithmic relationship. However, even if such a braking characteristic is set so that the reaction force of the brake pedal and the deceleration of the vehicle have the logarithmic relationship, there is still a possibility that the operator's intention does not match with the vehicle behavior.

During normal travel, since the operator can continuously predict the vehicle behavior through the perceived reaction force when the operator's perceived reaction force and the vehicle behavior are set to have the linear relationship, high operability can be secured. On the other hand, when emergency braking is caused, for example, by a sudden appearance of an obstacle, since the operator's intention is independent of their consciousness before this moment and a higher braking characteristic is demanded, the previous braking characteristic may not meet the response currently demanded by the operator. That is, it is not easy to achieve both the operability by the operator and the response of the vehicle at any operating state.

SUMMARY OF THE DISCLOSURE

Therefore, one purpose of the present disclosure is to provide a braking control device which is capable of achieving both operability by a vehicle operator and a response of the vehicle at any operating states.

According to one aspect of this disclosure, a braking control device for a vehicle is provided, which includes an operating amount detecting part configured to detect an operating amount of a brake pedal, a reaction-force giving part configured to generate a reaction force of the brake pedal based on the operating amount of the brake pedal, a braking-force generating part configured to generate a braking force for wheels, and an electronic control unit (ECU) electrically connected with the operating amount detecting part, the reaction-force giving part, and the braking-force generating part, the ECU including a processor configured to execute a control module to control the reaction-force giving part and the braking-force generating part, and a braking characteristic setting module configured to set a braking characteristic in which the reaction force according to a stepping force of the brake pedal and a deceleration of the vehicle have a logarithmic relationship, and when the reaction force is above a given reaction force, the control module controls the braking-force generating part based on the braking characteristic setting module while making the deceleration for the reaction force higher than the logarithmic relationship.

Since this braking control device includes the braking characteristic setting module configured to set the braking characteristic in which the reaction force according to the stepping force of the brake pedal and the deceleration of the vehicle have a logarithmic relationship, the deceleration proportional to the reaction force can be perceived by a vehicle operator, thereby improving operability of the brake pedal. When above the given reaction force, since the controller makes the deceleration for the reaction force higher than the logarithmic relationship and controls the braking-force generating part based on the braking characteristic, the deceleration can be controlled so as to be increased more than the linear relationship between a perceived operating amount of the operator according to the reaction force and a behavior of the vehicle at emergency braking where the reaction force becomes above the given reaction force, thereby demonstrating a braking performance with high response corresponding to a sudden slowdown intention of the operator.

When the reaction force is more than the given reaction force, the control module may control the braking-force generating part so that the deceleration becomes proportional to the reaction force. According to this configuration, the operator's perceived deceleration is increased while simplifying the configuration, thereby improving the operability at the emergency braking.

The braking characteristic setting module may set a stepping characteristic that is a correlation between a deceleration of the vehicle and a reaction-force giving value from a start to an end of stepping on the brake pedal, and a releasing characteristic that is a correlation between a deceleration of the vehicle and a reaction-force giving value from a start to an end of releasing the brake pedal, and the releasing characteristic is obtained by offsetting the stepping characteristic to a decreasing side of the reaction-force giving value. According to this configuration, a change tendency of the releasing characteristic and a change tendency of the stepping characteristic can be made substantially similar to each other, and the generation of the odd feel can be avoided when the operator shifts from the stepping operation to the releasing operation.

The reaction-force giving value when the deceleration is zero in the releasing characteristic may be set above 2 N and below 10 N. According to this configuration, the operability of the brake pedal in a near-zero range of the deceleration can be secured. This is because sensing of the operation of the brake pedal by the sole and the leg muscles is difficult if the reaction-force giving value is below 2 N, and the leg cannot sense the end of releasing of the brake pedal (the deceleration is zero) if the reaction-force giving value is above 10 N.

DETAILED DESCRIPTION OF THE DISCLOSURE

Hereinafter, one embodiment of the present disclosure is described in detail based on the accompanying drawings. The following description merely illustrates the present disclosure being applied to a braking control device for a vehicle, and thus, this description is not to limit the present disclosure, its applications, or its use.

Figure 1:
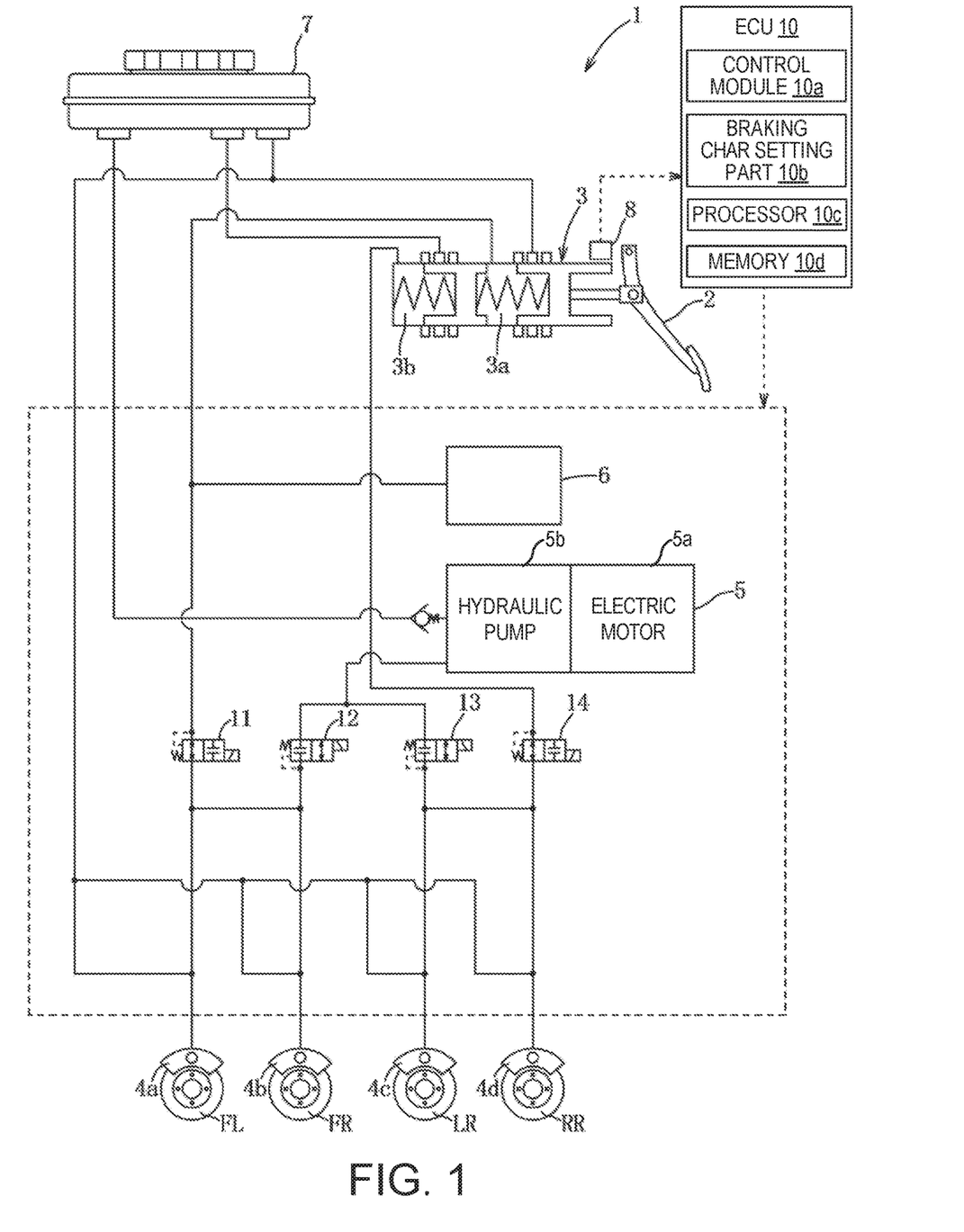
FIG. 1 is a view schematically illustrating a configuration of a braking control device for a vehicle according to one embodiment of the present disclosure.

Below, one embodiment of the present disclosure is described based on FIGS. 1 to 5. As illustrated in FIG. 1, a braking control device 1 constitutes a brake-by-wire mechanism, and includes a master cylinder 3 capable of generating brake hydraulic pressure corresponding to a stroke (stepping state) of a brake pedal 2, and a braking hydraulic pressure generating mechanism 5 (braking-force generating part) capable of supplying brake hydraulic pressure to wheel cylinders 4a-4d which respectively brake the rotations of front and rear, and left and right wheels FL, FR, RL, and RR of a vehicle. The device 1 is configured so that, when the braking hydraulic pressure generating mechanism 5 is normal, the brake hydraulic pressure which is doubled pressure (e.g., more than doubled) of operation of the brake pedal 2 is supplied from the braking hydraulic pressure generating mechanism 5 to the respective wheel cylinders 4a-4d, and when the braking hydraulic pressure generating mechanism 5 is abnormal, the brake hydraulic pressure which is equal to the operation of the brake pedal 2 is supplied from the master cylinder 3 to the respective wheel cylinders 4a-4d. Note that the device 1 is also provided with a reaction-force giving part 6 which causes the brake pedal 2 to generate a reaction force corresponding to a stroke of the brake pedal 2 when the braking hydraulic pressure generating mechanism 5 is normal.

First, the master cylinder 3 is described. The master cylinder 3 includes a first pressure generating chamber 3a and a second pressure generating chamber 3b. The first and second pressure generating chambers 3a and 3b are connected with a reservoir tank 7, and are provided therein with a compression spring, respectively. These first and second pressure generating chambers 3a and 3b are configured to pump substantially similar brake hydraulic pressures corresponding to a stepping operation of the brake pedal 2. The first pressure generating chamber 3a communicates with the wheel cylinders 4a and 4b through an electromagnetic valve 11 which can be opened and closed, and the second pressure generating chamber 3b communicates with the wheel cylinders 4c and 4d through an electromagnetic valve 14 which can be opened and closed. The electromagnetic valves 11 and 14 are closed when given current, while they are not given the current to be opened when the braking hydraulic pressure generating mechanism 5 is abnormal.

Next, the braking hydraulic pressure generating mechanism 5 is described. The braking hydraulic pressure generating mechanism 5 is connected with the reservoir tank 7, and is comprised of an electric motor 5a, a hydraulic pump 5b, etc. This braking hydraulic pressure generating mechanism 5 communicates with the wheel cylinders 4a and 4b through an electromagnetic valve 12 which can be opened and closed, and communicates with the wheel cylinders 4c and 4d through an electromagnetic valve 13 which can be opened and closed. The electromagnetic valves 12 and 13 are opened when given the current.

As illustrated in FIG. 1, when the electromagnetic valves 11 and 14 are opened and the electromagnetic valves 12 and 13 are closed, the brake hydraulic pressure is directly supplied from the master cylinder 3 to the respective wheel cylinders 4a-4d, and when the electromagnetic valves 11 and 14 are closed and the electromagnetic valves 12 and 13 are opened, the brake hydraulic pressure is supplied from the braking hydraulic pressure generating mechanism 5 to the respective wheel cylinders 4a-4d. A return channel to return the brake hydraulic pressure to the reservoir tank 7 is provided to a channel upstream of each of the wheel cylinders 4a-4d.

Next, the reaction-force giving part 6 is described. The reaction-force giving part 6 is comprised of a stroke simulator which simulates the consumption of oil, and is capable of absorbing and consuming the brake hydraulic pressure pumped from the master cylinder 3. This reaction-force giving part 6 is connected with a channel which communicates the first pressure generating chamber 3a with the electromagnetic valve 11, and is comprised of, for example, a cylinder, a piston which is slidable inside the cylinder, a biasing element which biases the piston, etc. Thus, when a vehicle operator steps on or releases the brake pedal 2, a reaction force (stepping force) with a preset characteristic can be acted on the operator through the brake pedal 2. Note that since the reaction force which acts from the brake pedal 2 on the operator's foot and the stepping force required for the operator to operate the brake pedal 2 are in a relationship of action and reaction, their expressions are unified into the reaction force in the following description.

The brake pedal 2 is provided with a stroke sensor 8 (operating amount detecting part) which detects a pedal stroke operating amount St (hereinafter, may be abbreviated as "stroke") which is an amount of stepping or releasing operation of the brake pedal 2 by the operator. The operator's stroke St detected by the stroke sensor 8 is outputted to an ECU (Electronic Control Unit; controller) 10 as a detection signal.

Next, the ECU 10 is described. The ECU 10 is comprised of a control module 10a, a braking characteristic setting module 10b, a processor 10c (e.g., a CPU (Central Processing Unit)), memory 10d (i.e., ROM and RAM), an IN-side interface, an OUT-side interface, etc. The ROM stores various programs, data, and maps for controlling the reaction force and the braking force, and the RAM is provided with a processing area used by the processor 10c to perform a series of processings. The processor 10c is configured to execute the control module 10a and the braking characteristic setting module 10b to perform their respective functions. Each module is stored in the memory 10d as software. The ECU 10 is electrically connected with the braking hydraulic pressure generating mechanism 5, the reaction-force giving part 6, the stroke sensor 8, and the electromagnetic valves 11-14, and is configured to execute deceleration control processing and reaction-force control processing.

Figure 2:
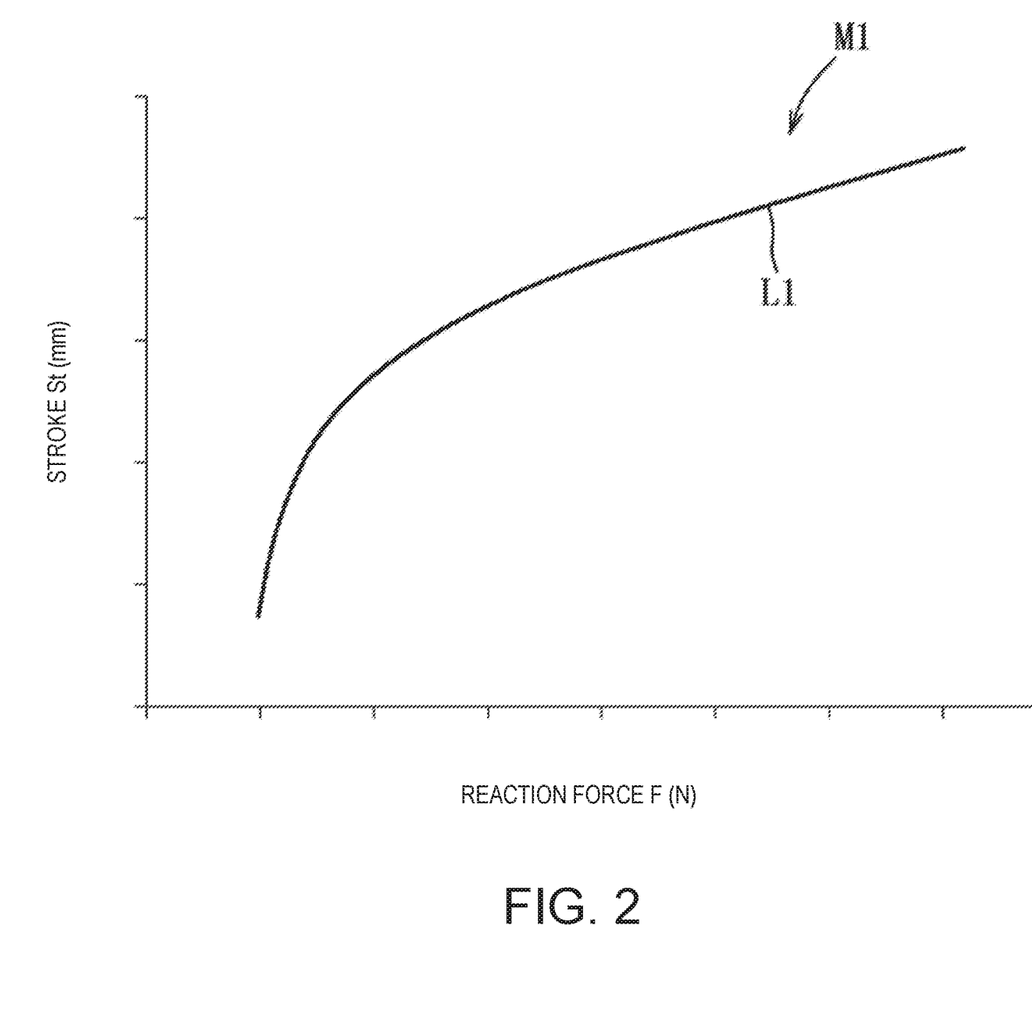
FIG. 2 is a map of a reaction-force characteristic illustrating by a graph of a relationship between a stroke and a reaction force.

First, the deceleration control processing is described. As illustrated in FIG. 2, the ECU 10 has a reaction-force characteristic map M1 stored in the memory 10d. As illustrated in the following formula (1), an operator's perception of sensation (sensitivity) is proportional to the logarithm of stimulus intensity (Weber-Fechner's law). Here, "A" is an amount of perception, and B is a physical quantity of stimuli, k is a gain, and K is a constant of integration.

$$A = k \log B + K \quad (1)$$

Therefore, a reaction-force characteristic L1 (e.g., a characteristic curve) in which a reaction force F by which the operator operates the brake pedal 2 and the stroke St of the brake pedal 2 become the logarithmic relationship is preset in the reaction-force characteristic map M1. The ECU 10 sets the reaction force F which is to be an initial value based on the stroke St detected by the stroke sensor 8 and the reaction-force characteristic map M1. Thus, the relationship between the reaction force F of the brake pedal 2 (operating force) which the operator perceives and the stroke St of the brake pedal 2 can be linear in terms of human's perception characteristic to avoid a deviation between the amount of perception which the operator senses through their somatic sensation, and the physical operating amount by which the brake pedal 2 is operated.

Figure 3:
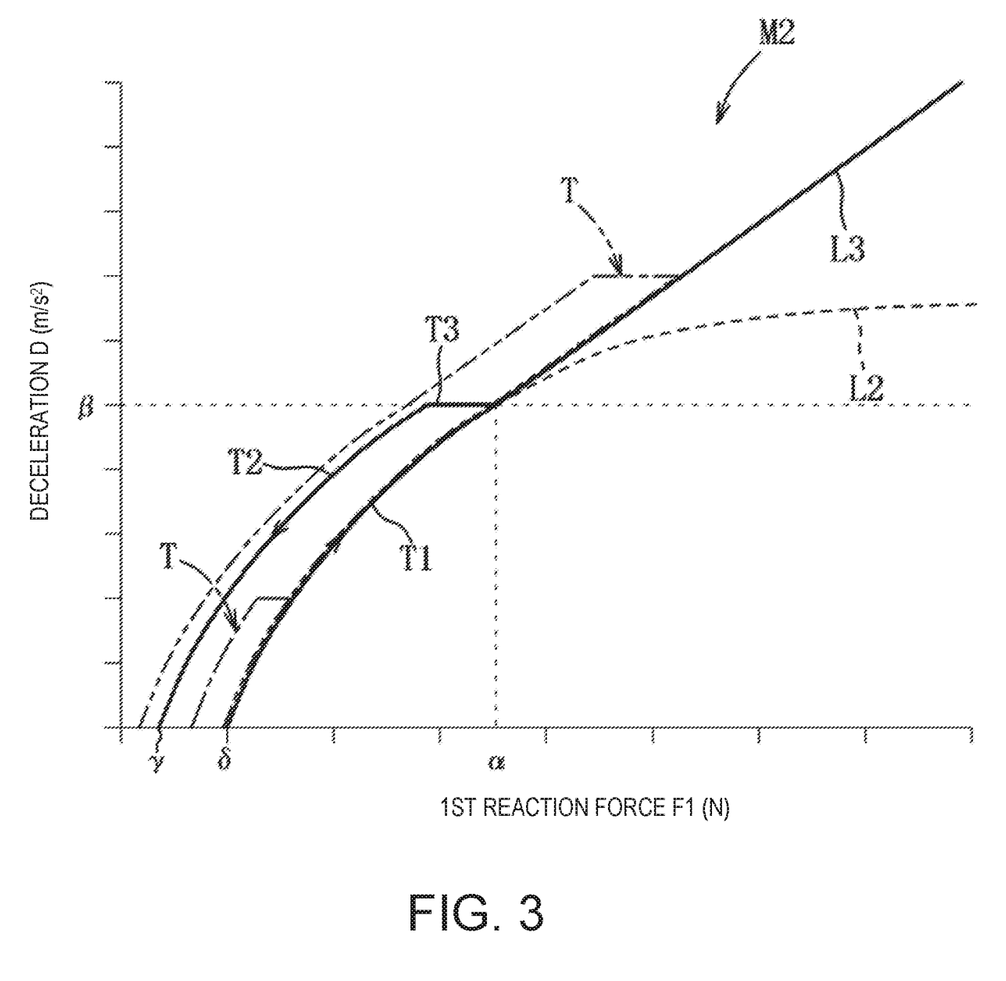
FIG. 3 is a map of a braking characteristic illustrating by a graph of a relationship between the reaction force and a deceleration.

As illustrated in FIG. 3, the ECU 10 has a braking characteristic map M2. The ECU 10 sets the reaction force F set through the detected stroke St as the first reaction force F1, sets a deceleration D corresponding to a target deceleration of the vehicle by using the first reaction force F1 and the braking characteristic map M2, and then outputs an operating instruction signal corresponding to the deceleration D to the braking hydraulic pressure generating mechanism 5 in a state where the electromagnetic valves 11 and 14 are closed and the electromagnetic valves 12 and 13 are opened. Thus, the respective wheel cylinders 4a-4d are driven, and braking of the deceleration D based on the braking characteristic map M2 is executed. Note that ECU 10 corresponds to a deceleration detector.

The braking characteristic map M2 is defined by the first reaction force F1 corresponding to the operator's operating force of the brake pedal 2 and the deceleration D of the vehicle, where a braking characteristic T is set, which is comprised of a stepping characteristic T1, a releasing characteristic T2, and a hysteresis T3 corresponding to a reaction-force difference (offset) between the stepping characteristic T1 and the releasing characteristic T2 when the releasing starts. The stepping characteristic T1 is set on a characteristic L2 in which the first reaction force F1 by which the operator operates the brake pedal 2 and the deceleration D of the vehicle become in the logarithmic relationship when the first reaction force F1 is below a threshold α, and is set on a characteristic L3 which is higher than the characteristic L2 and is a linear relationship (a proportional relationship between the first reaction force F1 and the deceleration D) when the first reaction force F1 is above the threshold α. The releasing characteristic T2 is a characteristic which is obtained by offsetting the stepping characteristic T1 to a reaction-force reducing side, for example, by 15 to 20 N. In this embodiment, the characteristic L3 is formed by a tangent at coordinates (α, β) of the characteristic L2.

The braking characteristic T can secure the linearity of the operating amount which the operator perceives (the amount of perception of the first reaction force F1) and the behavior of the vehicle (deceleration D), for example, up to the threshold β of the deceleration D required for emergency braking (the threshold α of the first reaction force F1 corresponding to the threshold β), that is during normal traveling of the vehicle, because the first reaction force F1 and the deceleration D of the vehicle are in the logarithmic relationship, thereby a suitable operational feel can be obtained. On the other hand, since the deceleration D of the vehicle is controlled so as to increase at the emergency braking, more than the linearity relationship between the operator's perceived amount of operation and the vehicle behavior, the device is capable of demonstrating the braking performance with a suitable response matching with the operator's braking demand, or a so-called "intention of rapid slowdown." As illustrated in FIG. 3, the braking characteristic T is set so that a residual reaction force γ when the deceleration D is zero in the releasing characteristic T2 is above 2 N and below 10 N. This is because sensing of the operation of the brake pedal 2 by the sole and the leg muscles is difficult if the residual reaction force γ is below 2 N, and the leg cannot sense the end of releasing of the brake pedal 2 (the deceleration D is zero) if the residual reaction force γ is above 10 N.

Moreover, as illustrated in FIG. 3, the ECU 10 sets the braking characteristic T (one-dot chain line) so that the hysteresis T3 decreases as the deceleration D at the releasing start becomes smaller, and sets the braking characteristic T (two-dot chain line) so that the hysteresis T3 increases as the deceleration D at the releasing start becomes larger. Thus, the hysteresis T3 is increased when the deceleration D is large at the releasing start where the motion is often and the functional switching period between the protagonist muscles and the antagonist muscles is long, while the hysteresis T3 is decreased when the deceleration D is small at the releasing start where the motion is not often and the functional switching period of the protagonist muscles and the antagonist muscles is short, to match the response of the vehicle behavior with the operator's muscle characteristics. The setting range of the hysteresis T3 is set above the residual reaction force γ, and below a stepping start reaction force δ when the deceleration D in the stepping characteristic T1 is zero (e.g., 30 N). That is to secure the functional switching period of the protagonist muscles and the antagonist muscles, and secure the operability of the brake pedal 2 when the deceleration D is within near-zero range.

Figure 4:
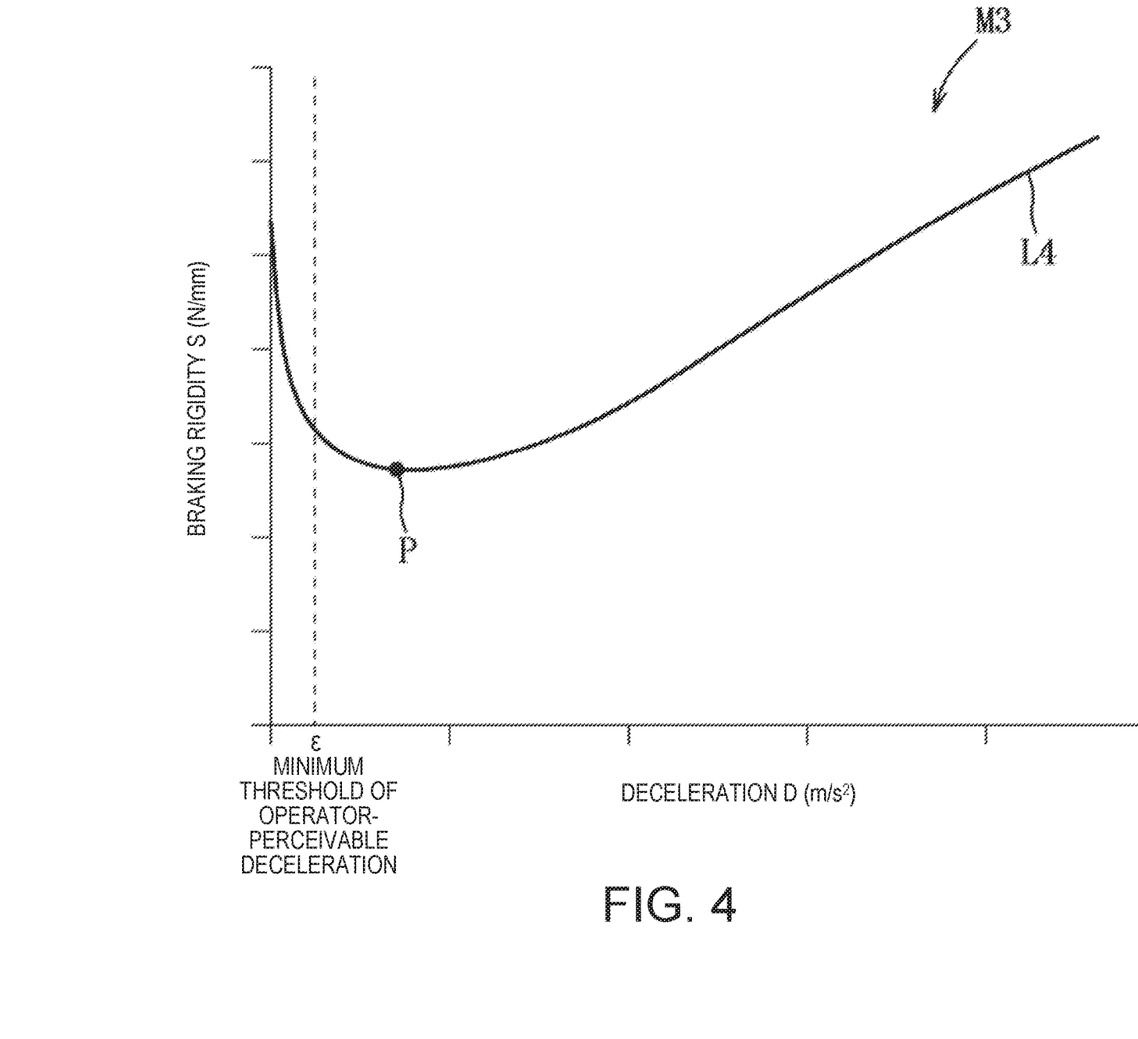
FIG. 4 is a map of a braking rigidity characteristic illustrating by a graph of a relationship between the deceleration and a braking rigidity.

Next, the reaction-force control processing is described. As illustrated in FIG. 4, the ECU 10 has a braking rigidity characteristic map M3. The ECU 10 sets a second reaction force F2 using the detected stroke St, the set deceleration D, and the braking rigidity characteristic map M3, and outputs the operating instruction signal corresponding to the second reaction force F2 to the reaction-force giving part 6. The second reaction force F2 set here is the operational reaction force which actually acts on the operator, and is the stepping force F of the operator required for the operation of the brake pedal 2. In the braking rigidity characteristic map M3, a braking rigidity characteristic L4 is set by the deceleration D and the braking rigidity S. The braking rigidity S is calculated by substituting the second reaction force F2 of the brake pedal 2 and the stroke St of the brake pedal 2 by the operator in the following formula (2).

$$S = F2/St \quad (2)$$

As a precondition, it is assumed that the logarithmic relationship is established between the second reaction force F2 and the deceleration D.

Figure 5:
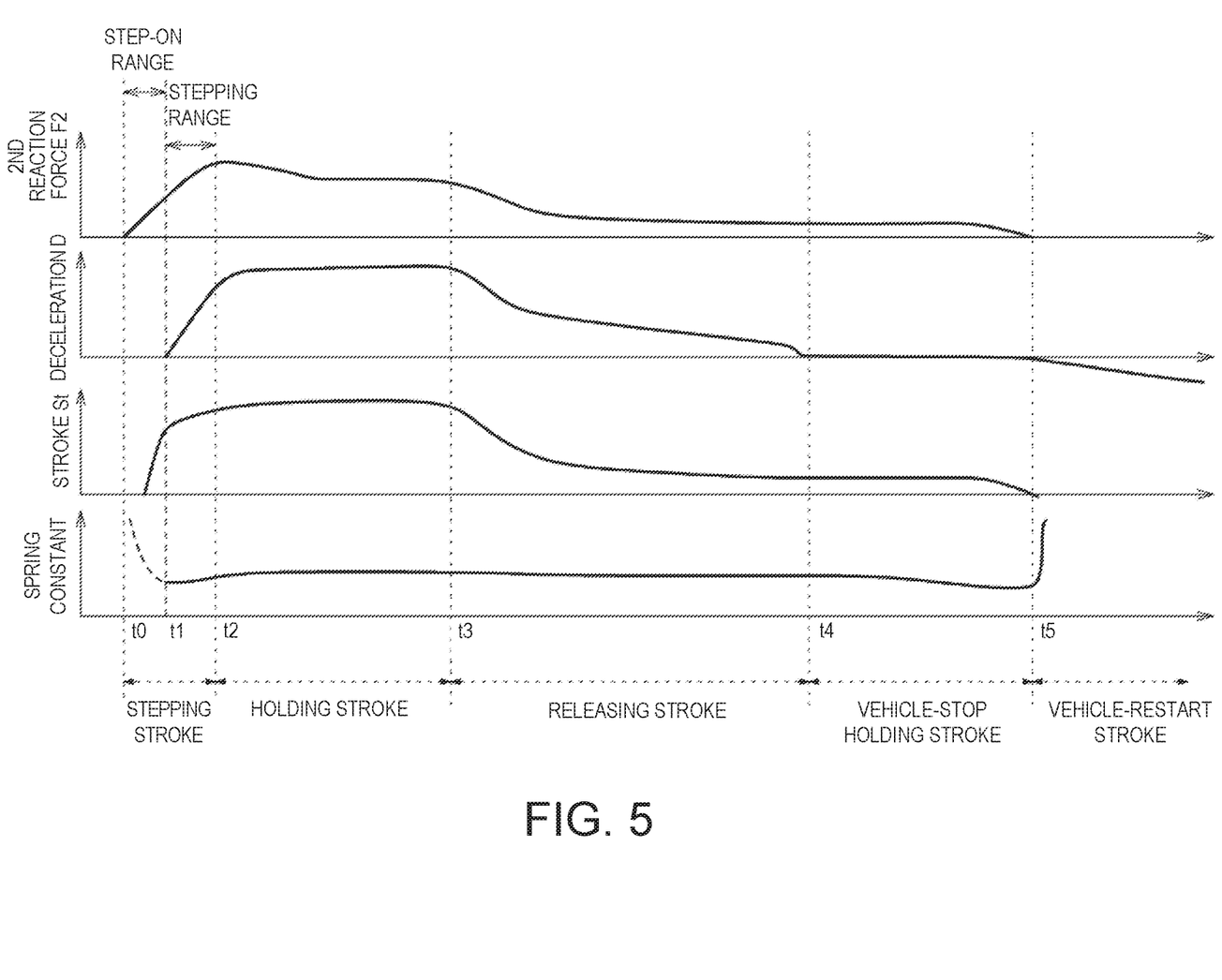
FIG. 5 is a time chart of each element when braking is applied to the vehicle.

Here, the reason for having set the braking rigidity characteristic L4 is described. Normally, as illustrated in FIG. 5, the operation of the vehicle is comprised of a stepping stroke (t0-t2) of the brake pedal 2 by the operator, a holding stroke (t2-t3) of the brake pedal 2, a releasing stroke (t3-t4) of the brake pedal 2, a vehicle-stop holding stroke (t4-t5), and a vehicle-restart stroke (t5-). Note that the spring constant represents the physical operational characteristic of the brake pedal 2. The stepping stroke is comprised of a step-on range (t0-t1) in which the mechanism play of brake pedal 2, etc., is eliminated (cut) by the operator moving the foot onto the brake pedal 2 and operating the brake pedal 2, and a stepping range (t1-t2) in which the stepping operation is performed intentionally. In the brake-by-wire mechanism, since the matching between the end timing of the step-on range and the eliminated timing of the play (the point of inflection of the stroke St), and the matching between the start timing of the deceleration D and the eliminated timing of the play affect the operating performance of the brake pedal 2 and the braking performance of the vehicle, the second reaction force F2 is set based on the braking rigidity characteristic L4 and the stroke St, instead of using the first reaction force F1 set based on the reaction-force characteristic map M1, and the second reaction force F2 is given to the vehicle operator through the brake pedal 2.

As illustrated in FIG. 4, since the inclination characteristic of the braking rigidity S is turned from negative to positive bordering on a local minimum point P of the braking rigidity characteristic L4, the local minimum point P serves as a starting point of the operator's perception of the stepping operation of the brake pedal 2. Therefore, the operator's perception of the stepping of the brake pedal 2 becomes slower or delayed as the local minimum point P shifts to the increasing side of the deceleration D regardless of the deceleration D occurring on the vehicle in fact, and as a result, the deviation arises between the vehicle behavior and the expected operation of the brake pedal 2. For this reason, the local minimum point P is set at the deceleration D of the near-zero range in terms of operability. In this embodiment, the local minimum point P is set at the deceleration D slightly larger than a minimum threshold c of the operator-perceivable deceleration D (e.g., 0.2 to 0.5 m/s). Thus, the operator can foresee the actual start of the stepping operation of the brake pedal 2 in advance (perceivable of the elimination of the play) upon the operation accompanied by the negative braking rigidity S, while improving the braking response of the vehicle.

Moreover, the slope of the braking rigidity characteristic L4 on the increasing side from the local minimum point P is set within a range of 0.10 to 0.30 ((N/mm)/(m/s$^2$)), for example. Since the operator's stepping feel of the brake pedal 2 is small if the slope of the braking rigidity characteristic L4 is below 0.10, it is difficult for the operator to perceive the operating feel of the brake pedal 2 (strong spongy feel), and since the reaction force F required for the operation of the brake pedal 2 is high if exceeding 0.30, it is difficult for the operator to step on the brake pedal 2 (strong feel of stepping on a plate) thereby degrading the operability.

Next, operation and effects of the braking control device 1 for the vehicle are described. In the braking control device 1 according to this embodiment, since the ECU 10 has the braking characteristic T in which the first reaction force F1 according to the reaction force of the brake pedal 2 and the deceleration D of the vehicle have the logarithmic relationship, the deceleration D proportional to the first reaction force F1 can be perceived by the operator, thereby improving the operability of the brake pedal 2. When above the given reaction force α, since the ECU 10 makes the deceleration D for the reaction force F higher than the logarithmic relationship and controls the braking hydraulic pressure generating mechanism 5 based on the braking characteristic T, the deceleration D can be controlled so as to be increased more than the linearity relationship between the perceived operating amount of the operator according to the reaction force F and the behavior of the vehicle at the emergency braking where the reaction force becomes above the given reaction force α, thereby demonstrating the braking performance with the high response corresponding to the sudden slowdown intention of the operator.

Since the ECU 10 sets the deceleration D proportional to the first reaction force F1 when more than the given reaction force α, the operator's perceived deceleration is increased while simplifying the configuration, thereby improving the operability at the emergency braking.

Since the braking characteristic T is comprised of the stepping characteristic T1 and the releasing characteristic T2 which is obtained by offsetting the stepping range T1 to the reaction-force reducing side, the change tendency of the releasing characteristic T2 and the change tendency of the stepping characteristic T1 can be made substantially similar to each other, and the generation of the odd feel can be avoided when the operator shifts from the stepping operation to the releasing operation.

Since the residual reaction force γ when the deceleration D in the releasing characteristic T2 is zero is set above 2 N and below 10 N, the operability of the brake pedal 2 in the near-zero range of the deceleration D can be secured.

Next, several modifications in which the above embodiment is partially changed are described.

1) Although in the above embodiment the example of the braking characteristic which sets the deceleration proportional to the first reaction force when above the given reaction force is described, the deceleration may at least be larger than the logarithmic relationship characteristic when less than the given reaction force, e.g., the braking characteristic may be an upwardly convex curve characteristic or may be a downwardly convex curve characteristic.

2) Although in the above embodiment the example in which the second reaction force is set using the deceleration set based on the braking rigidity characteristic map, the stroke, and the braking characteristic map is described, a deceleration detector, such as a speed sensor, may be provided, and the second reaction force may be set using the braking rigidity characteristic map, the stroke, and the detected deceleration.

3) It should be appreciated that a person skilled in the art may implement variously changed forms of the above embodiment and modifications, or a combination of the above embodiment and/or modifications, without departing from the scope of the present disclosure, and the present disclosure also includes such changes and combinations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Braking Control Device
2 Brake Pedal
5 Braking Hydraulic Pressure Generating Mechanism
6 Reaction-force Giving Part
8 Stroke Sensor
10 ECU (electronic control unit)
T Braking Characteristic
T1 Stepping Characteristic
T2 Releasing Characteristic

What is claimed is:

1. A braking control device for a vehicle, comprising:
a stroke sensor configured to detect an operating amount of a brake pedal;
a stroke simulator configured to generate a reaction force of the brake pedal based on the operating amount of the brake pedal;
hydraulic brakes configured to generate a braking force for wheels; and
an electronic control unit (ECU) electrically connected with the stroke sensor, the stroke simulator, and the hydraulic brakes, the ECU including a processor and a memory storing software modules to be executed by the processor, the software modules comprising:
a control module to control the stroke simulator and the hydraulic brakes; and
a braking characteristic setting module configured to set a braking characteristic in which the reaction force according to a stepping force of the brake pedal and a deceleration of the vehicle have a logarithmic relationship, and when the reaction force is above a given reaction force, the control module controlling the hydraulic brakes based on the braking characteristic setting module while controlling the deceleration of the vehicle to be higher than a deceleration of the vehicle corresponding to the reaction force according to the logarithmic relationship.

2. The braking control device of claim 1, wherein, when the reaction force is more than the given reaction force, the control module controls the hydraulic brakes so that the deceleration becomes proportional to the reaction force.

3. The braking control device of claim 2, wherein the braking characteristic setting module sets a stepping characteristic that is a correlation between a deceleration of the vehicle and a reaction-force giving value from a start to an end of stepping on the brake pedal, and a releasing characteristic that is a correlation between a deceleration of the vehicle and the reaction-force giving value from a start to an end of releasing the brake pedal, and the releasing characteristic is obtained by offsetting the stepping characteristic to a decreasing side of the reaction-force giving value.

4. The braking control device of claim 3, wherein the reaction-force giving value when the deceleration is zero in the releasing characteristic is set above 2 N and below 10 N.

5. The braking control device of claim 1, wherein the braking characteristic setting module sets a stepping characteristic that is a correlation between a deceleration of the vehicle and a reaction-force giving value from a start to an end of stepping on the brake pedal, and a releasing characteristic that is a correlation between a deceleration of the vehicle and a reaction-force giving value from a start to an end of releasing the brake pedal, and the releasing characteristic is obtained by offsetting the stepping characteristic to a decreasing side of the reaction-force giving value.

6. The braking control device of claim 5, wherein the reaction-force giving value when the deceleration is zero in the releasing characteristic is set above 2 N and below 10 N.

* * * * *